N. M. BAKER.
EYEGLASSES.
APPLICATION FILED OCT. 10, 1908.
1,099,111.
Patented June 2, 1914.
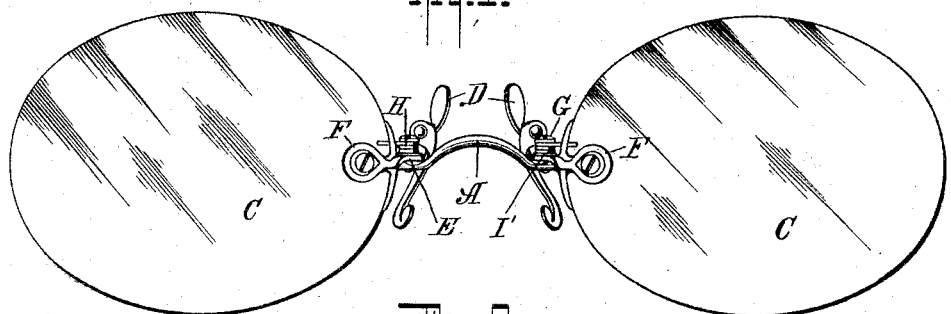
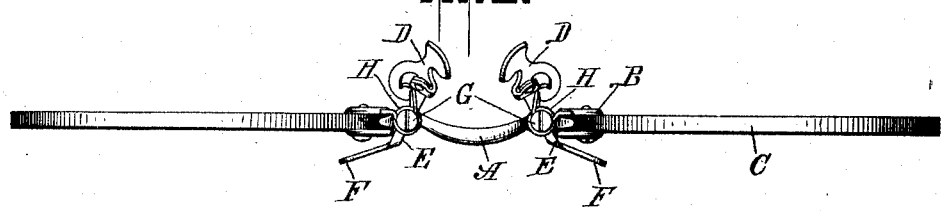
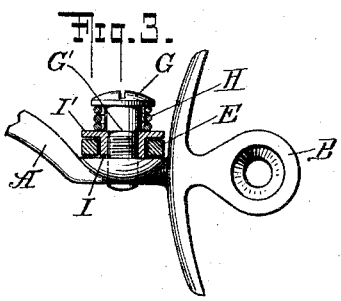
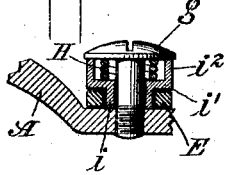
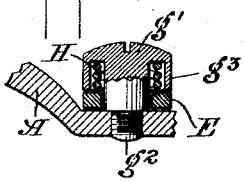
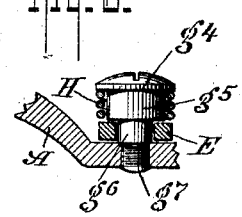
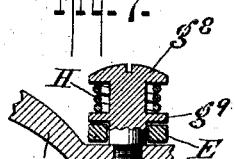
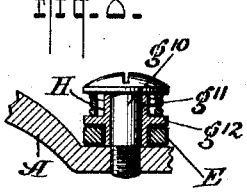
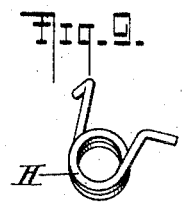
WITNESSES:
G. V. Rasmussen
John A. Tenenkek
INVENTOR
NELSON M. BAKER
BY
ATTORNEYS

UNITED STATES PATENT OFFICE.

NELSON M. BAKER, OF SOUTHBRIDGE, MASSACHUSETTS, ASSIGNOR TO AMERICAN OPTICAL COMPANY, OF WORCESTER, MASSACHUSETTS, A CORPORATION OF MASSACHUSETTS.

EYEGLASSES.

1,099,111.            Specification of Letters Patent.     Patented June 2, 1914.

Application filed October 10, 1908. Serial No. 457,119.

*To all whom it may concern:*

Be it known that I, NELSON M. BAKER, a citizen of the United States, resident of Southbridge, county of Worcester, and State of Massachusetts, have invented certain new and useful Improvements in Eyeglasses, of which the following is a specification.

My invention relates to eye glasses in which the nose clamps are swiveled and spring pressed and provided with finger pieces for manipulating them and has for its object to provide an improved bearing for the finger piece, which will be secure and which will not readily wear out through continued use.

My invention will be fully described hereinafter and the features of novelty will be pointed out in the appended claims.

Reference is to be had to the accompanying drawing in which—

Figure 1 is a face view of a pair of eyeglasses with my invention applied thereto; Fig. 2 is a plan view thereof; Fig. 3 is an enlarged detail view with parts in section; Figs. 4, 5, 6, 7 and 8 are enlarged sectional views showing different forms of my invention and Fig. 9 is a perspective view of one form of spring which may be used in connection with my device.

A represents the nose bridge to each end of which are secured the lens clamps B between which are fastened the lenses C. Nose clamps D serve to maintain the glasses in position on the face and are provided with arms E which terminate in operating finger pieces F. Screws G extend into the nose bridge A and serve as pivots about which the arms E (and nose clamps D) may be swung, the arms being preferably perforated to receive the screws. A coil spring H surrounds each of said screws G with its one end abutting against the lens clamp B and its other end in engagement with the nose clamp D. The tendency of this spring is to press the nose clamps D toward each other so that a pressure is exerted on the nose of the wearer for maintaining the glasses in position. To prevent the spring from bearing directly on the arm E I provide a sleeve I having a flange I′, which sleeve surrounds the screw G and extends through the said arm E. This sleeve may be held in position by a shoulder G′ on the screw G as shown in Fig. 3. In this form of my invention the arm E thus moves between the upper surface of the nose bridge A and the lower surface of the flange I′ and around the sleeve I. In this form the spring H is held between the head of the screw G and the flange I′ and does not bear upon the said arm E. This arm E is also prevented from wabbling by being held between the flange I′ and the nose bridge A.

In the form of my device shown in Fig. 4 the screw $g$ is provided with a shank of even diameter throughout and is surrounded by a sleeve $i$ having a flange $i'$ and an upwardly extending portion $i^2$ which forms a chamber in which the spring H is located and concealed. In this instance the sleeve is held in position by having the head of the screw $g$ bear against the upper edge of the projection $i^2$. It is to be understood that suitable openings are left in the upwardly projecting portion $i^2$ through which the ends of the spring H project. Otherwise this form of my invention is the same as that shown and described with regard to Figs. 1, 2 and 3.

Referring now to Fig. 5, the screw $g'$ is provided with a reduced screw threaded portion $g^2$, which screws into the nose bridge A. The head of the screw is provided with a downwardly projecting circumferential flange $g^3$, which engages the upper surface of the arm E. This arm E in this form is thus held between the said flange $g^3$ and the nose bridge A, the spring H being contained and concealed in the annular space formed by the flange $g^3$. In this form there are also provided suitable openings in the flange $g^3$ through which the ends of the spring H project.

In Fig. 6 I have shown the screw $g^4$ provided with an enlarged portion $g^5$, which forms a shoulder adapted for engagement with the upper surface of the arm E, which arm E is thus held between the said shoulder and the upper surface of the nose bridge A. The screw is further provided with a smooth reduced portion $g^6$ which forms a bearing for the arm E and a screw threaded portion $g^7$ which screws into the bridge A. The spring H surrounds the portion $g^6$ of the screw $g^4$. Otherwise this form of my device is also the same as the forms previously described.

In Fig. 7 the screw $g^8$ screws into the bridge A and the shank thereof is provided with a circular flange $g^9$. In this form the arm E is located between this flange $g^9$ and the bridge A. The spring H surrounds the shank of the screw between said flange $g^9$ and the head of the screw.

In Fig. 8 the screw $g^{10}$ has a shank of even diameter throughout the same as shown in Fig. 4, which shank is surrounded by a sleeve $g^{11}$, which engages the head of said screw and the upper surface of the bridge A. This sleeve is provided with a flange $g^{12}$ which engages the arm E and maintains it in position on the bridge A. In this form of my invention the spring H is held between the head of the screw $g^{10}$ and the flange $g^{12}$, and the arm E is located between said flange $g^{12}$ and the bridge A and surrounds the sleeve $g^{11}$.

In all the forms of my invention, movement of the pivoted arm is prevented by having the arm engaged on both of its surfaces by stationary parts or bearings. In the forms shown in Figs. 3, 4, 7, and 8 the arm is also protected against wear resulting from frictional engagement with the spring.

Various modifications may be made without departing from the nature of my invention as defined in the claims.

I claim:

1. In an eyeglass, in combination with a pair of lenses connected by a bridge, nose clamps each provided with an arm which engages said bridge, pivots each extending into the bridge through said arms and projecting beyond the arms, means concentric with said pivots for engaging one side of said arms and yielding means surrounding the pivot projections beyond the arms for pressing the nose clamps toward each other.

2. In an eyeglass, in combination with a pair of lenses connected by a bridge, nose clamps each provided with an arm which engages said bridge, pivots each extending into the bridge through said arms and projecting beyond the arms, means concentric with said pivots and spaced from said bridge for engaging one side of said arms, and yielding means surrounding the pivot projections beyond the arms for pressing the nose clamps toward each other.

3. In an eyeglass, in combination with a pair of lenses connected by a bridge, nose clamps each provided with an arm which engages said bridge, pivots each extending into the bridge through said arms and provided with means for engaging one side of said arms, means comprising springs for pressing the nose clamps together, and means concentric with said pivots for separating said springs from said arm.

4. In an eyeglass, in combination with a pair of lenses connected by a bridge, nose clamps each provided with an arm which engages said bridge, pivots each extending into the bridge through said arms and springs mounted upon the pivots for pressing the nose pieces together, said pivots being each provided with a bearing surface arranged to engage one side of said arm and with a separate bearing surface to support said spring and separate it from said arm.

5. In eyeglasses provided with pivoted spring controlled nose clamps, a pivot screw provided with a threaded end, a shoulder for engagement with the bridge, a second shoulder adapted for engagement with a part attached to the nose clamp and an annular recess for the controlling spring, substantially as described.

6. In eyeglasses provided with pivoted spring controlled nose clamps, a pivot screw having one end threaded, a head at the other end, a shoulder adjacent the thread and an annular recess between said head and said shoulder, substantially as and for the purpose described.

7. As an article of manufacture, an element for eyeglasses or mountings comprising a pivot member having a head at one end and a projection at the other for receiving the finger piece, and for fastening the pivot member to the frame or mounting, an integral collar on said pivot member spaced from the head, and a spring mounted between the head and collar, whereby said spring cannot become accidentally separated from the pivot member.

8. In eyeglasses or mountings, the combination of the frame and finger piece therefor, with a headed pivot member for connecting the frame and finger piece, said pivot member being affixed to the frame, a spring wound on said member, and integral means on the pivot member between the spring and finger piece for keeping the spring of constant length and preventing its exerting pressure on the finger piece or frame and for retaining the spring on the pivot member when removed from the frame.

9. In eyeglasses or mountings the combination of a frame and finger piece therefor, with a pivot member having a head, an integral collar spaced from said head, a spring between the head and collar, whereby the collar prevents the separation of the spring from the pivot member when removed from the frame, a cylindrical portion beyond the collar on which the finger piece is pivoted, and a reduced portion beyond the cylindrical portion adapted to be secured to the frame.

10. In an eyeglass in combination with a pair of lenses connected by a bridge, nose clamps each provided with an arm which engages said bridge, means comprising springs for pressing the nose clamps together and pivots each extending into the bridge through said arms and provided with means which simultaneously engage one side of said arms and separate said springs from said arms.

In testimony whereof I have hereunto set my hand in the presence of two subscribing witnesses.

NELSON M. BAKER.

Witnesses:
F. G. BLANCHARD,
E. E. SABIN.